(12) United States Patent
Shimoyama et al.

(10) Patent No.: US 10,005,434 B2
(45) Date of Patent: Jun. 26, 2018

(54) WIPER APPARATUS

(71) Applicants: Mitsuba Corporation, Gunma (JP);
Honda Motor Co., Ltd., Tokyo (JP)

(72) Inventors: Masayuki Shimoyama, Gunma (JP);
Masayuki Arima, Gunma (JP);
Daisuke Kobayashi, Gunma (JP);
Takeshi Sasaki, Saitama (JP); Tatsuya Ohmaru, Saitama (JP); Taisuke Goto, Saitama (JP)

(73) Assignees: Mitsuba Corporation, Kiryu-shi, Gunma (JP); Honda Motor Co., Ltd., Tokyo (JP)

( * ) Notice: Subject to any disclaimer, the term of this patent is extended or adjusted under 35 U.S.C. 154(b) by 0 days. days.

(21) Appl. No.: 15/298,661

(22) Filed: Oct. 20, 2016

(65) Prior Publication Data

US 2017/0113658 A1    Apr. 27, 2017

(30) Foreign Application Priority Data

Oct. 22, 2015   (JP) .................................. 2015-207939

(51) Int. Cl.
*B60S 1/52* (2006.01)
*B60S 1/34* (2006.01)
*B60S 1/40* (2006.01)

(52) U.S. Cl.
CPC ............. *B60S 1/522* (2013.01); *B60S 1/3415* (2013.01); *B60S 1/4006* (2013.01)

(58) Field of Classification Search
CPC ................................ B60S 1/522; B60S 1/524
(Continued)

(56) References Cited

U.S. PATENT DOCUMENTS 4,516,288 A * 5/1985 Fizyta ..................... B60S 1/522
15/250.04
2008/0127441 A1 6/2008 Inoue
(Continued)

FOREIGN PATENT DOCUMENTS

EP          1520759 A1 *   4/2005  ................. B60S 1/32
FR          3007363 A1 *  12/2014  ............ B60S 1/3409
JP       2008137459 A      6/2008

OTHER PUBLICATIONS

EP1520759A1 (machine translation), 2005.*
FR3007363A1 (machine translation), 2014.*

*Primary Examiner* — Andrew A Horton
(74) *Attorney, Agent, or Firm* — McCormick, Paulding & Huber LLP

(57) ABSTRACT

A wiper apparatus is improved in wiping performance, and can suppress a disturbance due to cleaning liquid in a driver's field of view. Each cleaning liquid W1 and W2 is jetted from four forward-side injection nozzles and four backward-side injection nozzles in a direction opposite to the wiper blade 20, and toward injection-target locations, and a distance between the wiper blade 20 and an injection-target location for cleaning liquid W1 and W2 on the opposite side from a center of a swinging motion of the wiper blade 20 in a wiping direction of the wiper blade 20 is larger than a distance between the wiper blade 20 and an injection-target location for cleaning liquid W1 and W2 on the same side as the center of the swinging motion of the wiper blade in the wiping direction of the wiper blade 20. Therefore, on the same side as the center of the swinging motion of the wiper blade 20, it is possible to suppress a disturbance due to cleaning liquid in the driver's field of view, and on the opposite side from the center of the swinging motion of the wiper blade 20, it is possible to (Continued)

enhance the wiping performance of the wiper apparatus by sufficiently wetting dust and the like.

3 Claims, 9 Drawing Sheets

(58) Field of Classification Search
USPC .................................................. 15/250.04
See application file for complete search history.

(56) References Cited

U.S. PATENT DOCUMENTS

| | | | |
|---|---|---|---|
| 2013/0152320 A1* | 6/2013 | Matsumoto | B60S 1/3801 15/250.01 |
| 2016/0229377 A1* | 8/2016 | Thebault | B60S 1/3894 |

* cited by examiner

WIPER APPARATUS

CROSS-REFERENCE TO RELATED APPLICATION

The present application claims priority from Japanese Patent Application No. 2015-207939 filed on Oct. 22, 2015, the content of which is hereby incorporated by reference into this application.

TECHNICAL FIELD OF THE INVENTION

The present invention relates to a wiper apparatus including a wiper blade which wipes a windshield and a nozzle unit which jets cleaning liquid.

BACKGROUND OF THE INVENTION

A vehicle, such as automotive vehicle, is equipped with a wiper apparatus which ensures a field of view from a driver through a windshield. The wiper apparatus includes a wiper arm which is swung by an electric motor, and a wiper blade attached to the wiper arm. When a wiper switch provided in a vehicle interior is switched on, the wiper arm is swung, thereby reciprocating a blade rubber on a windshield to be wiped. As a result, the blade rubber wipes away rainwater, etc., from the windshield.

When extraneous matters such as dust attach to the windshield, the wiper blade is reciprocated on a windshield as cleaning liquid is jetted onto the windshield. Through this process, the extraneous matter such as dust attached to the windshield is wetted and completely wiped out without scratching the windshield. Usually, cleaning liquid is jetted from a nozzle unit disposed on a hood, etc., of the vehicle, onto the windshield. This case, however, encounters such a problem that cleaning liquid jetted toward an injection-target location of the windshield disturbs the driver's field of view, and the long distance between the nozzle unit and the windshield exposes cleaning liquid to aerodynamic drag caused by the running vehicle, resulting in a significant shift in the injection-target location for cleaning liquid, and that use of a relatively large amount of cleaning liquid requires frequent refilling of a tank with cleaning liquid.

In order to solve the above problems, for example, a wiper apparatus disclosed in Japanese Patent Application Laid-Open Publication No. 2008-137459 (patent document 1) has been developed. The wiper apparatus described in patent document 1 includes a wiper blade connected rotatably to the front end of a wiper arm and a washer nozzle attached to the front end of the wiper arm. The washer nozzle jets cleaning liquid toward the wiper blade, thereby allowing cleaning liquid to reach a predetermined area in the longitudinal direction of the wiper blade.

RELATED ART DOCUMENTS

Patent Documents

Patent document 1: Japanese Patent Application Laid-Open Publication No. 2008-137459 (FIG. 2)

SUMMARY OF THE INVENTION

According to the wiper apparatus of the above patent document 1, since the washer nozzle jets cleaning liquid toward the wiper blade, cleaning liquid hardly disturbs the driver's field of view. However, cleaning liquid jetted from the washer nozzle is wiped immediately away from the windshield by the wiper blade. In this case, cleaning liquid is wiped away from the windshield before it wets foreign matters such as dust on the windshield. This leads to a problem of dropping wiping performance of the wiper apparatus.

An object of the present invention is to provide a wiper apparatus improved in wiping performance, which can suppress a disturbance due to cleaning liquid in a driver's field of view.

In accordance with a first aspect of the present invention, there is provides a wiper apparatus, comprising: a wiper blade which wipes a windshield; a wiper arm having two ends, a wiper blade and a nozzle unit being attached to one end of the wiper arm, and the other end of the wiper arm being supported and pivotally moved with respect to a pivot shaft; and a nozzle provided to the nozzle unit and adapted to jet cleaning liquid in a wiping direction of the wiper blade, wherein cleaning liquid is jetted from the nozzle in a direction opposite to the wiper blade, and toward injection-target locations, wherein a distance between the wiper blade and an injection-target location for cleaning liquid on the opposite side from the center of the swinging motion of the wiper blade in a wiping direction of the wiper blade is larger than a distance between the wiper blade and an injection-target location for cleaning liquid on the same side as the center of the swinging motion of the wiper blade in the wiping direction of the wiper blade.

According to another aspect of the present invention, a location at which the nozzle unit may be disposed is defined as a base point relative to the wiper blade, and each injection-target location may be gradually distanced from the wiper blade in the wiping direction with an increasing distance from the base point toward an area opposite to the center of the swinging motion of the wiper blade.

According to still another aspect of the present invention, a location at which the nozzle unit may be disposed is defined as a base point relative to the wiper blade, and the distance from the wiper blade to the injection-target location may be maintained constant in an area closer to the center of the swinging motion of the wiper blade with respect to the base point.

According to still another aspect of the present invention, the shortest distance "L" selected among distances between the wiper blade and the injection-target locations may satisfy the following equation.

$$L = v \times t \quad \text{Equation}$$

Herein, "L" denotes a jet distance, "v" denotes a circumferential speed of the wiper blade, and "t" denotes a dissolving time for attached foreign matters.

According to the present invention, cleaning liquid to be jetted from the nozzle is pointed in a direction opposite to the wiper blade, and the injection-target location for cleaning liquid defined in an area opposite to the center of the swinging motion of the wiper blade is distant from the wiper blade in its wiping direction than the injection-target location defined in an area closer to the center of the swinging motion of the wiper blade. As a result, it is possible to suppress a disturbance due to cleaning liquid in a driver's field of view in the area closer to the center of the swinging motion of the wiper blade. On the other hand, in the area opposite to the center of the swinging motion of the wiper blade, since dust, etc., is wetted sufficiently, it is possible to improve the wiping performance.

DESCRIPTION OF THE PREFERRED EMBODIMENTS

Hereinafter, a first embodiment of the present invention will be described in detail with reference to the accompanying drawings.

Figure 1:
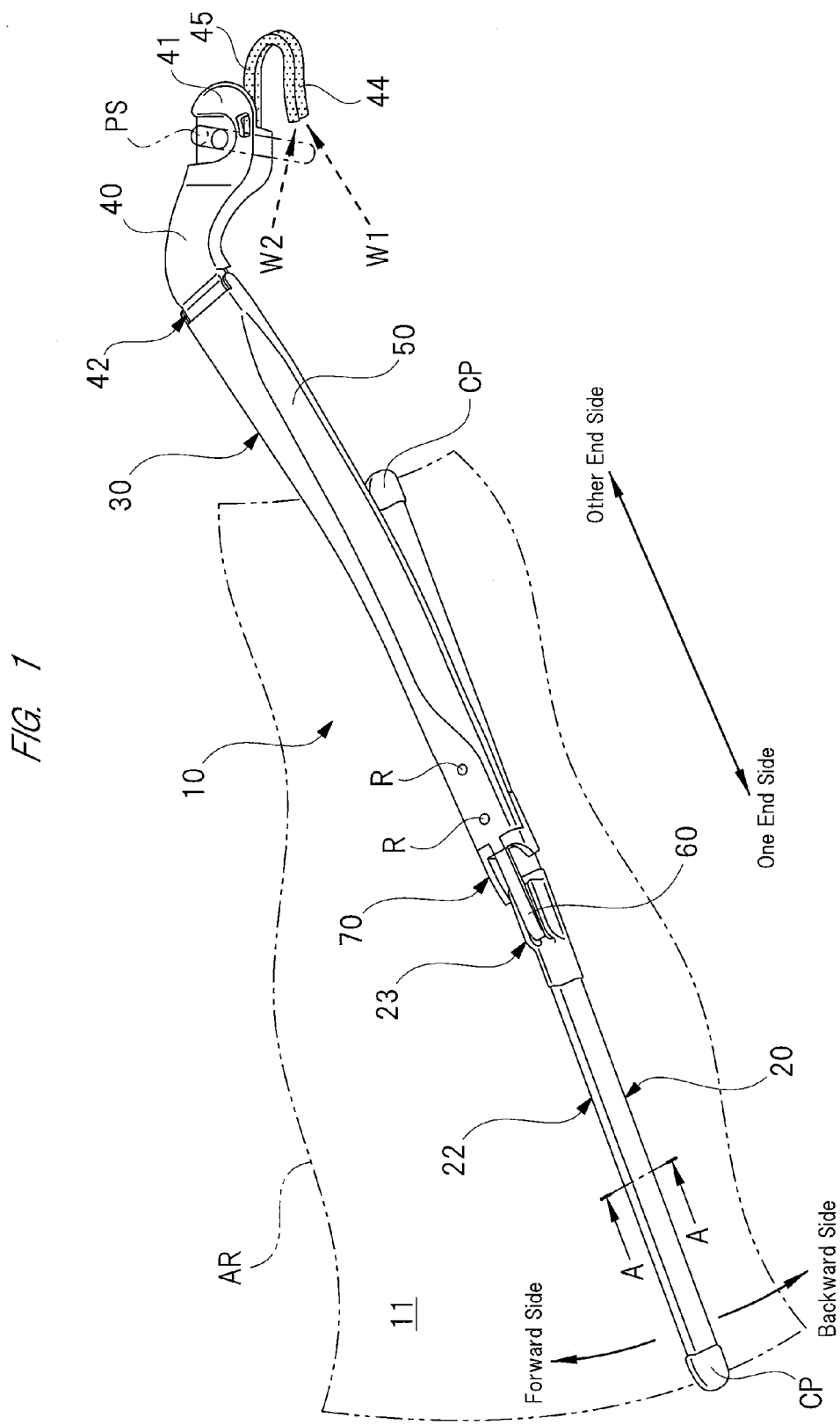
FIG. 1 is a perspective view of a wiper apparatus according to the present invention.
Figure 2:
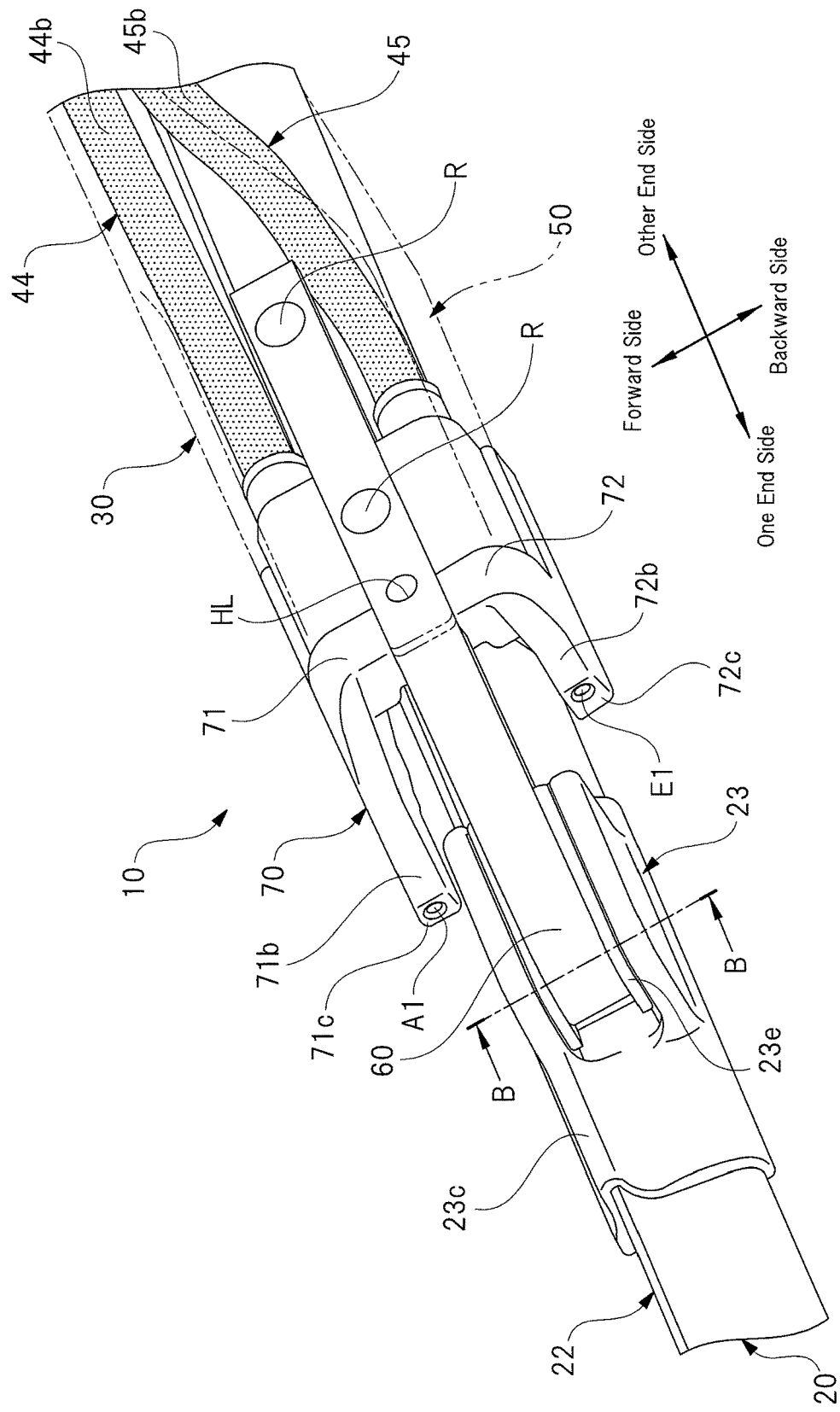
FIG. 2 is an enlarged perspective view of the surrounding part of a nozzle unit seen from its front side.
Figure 3:
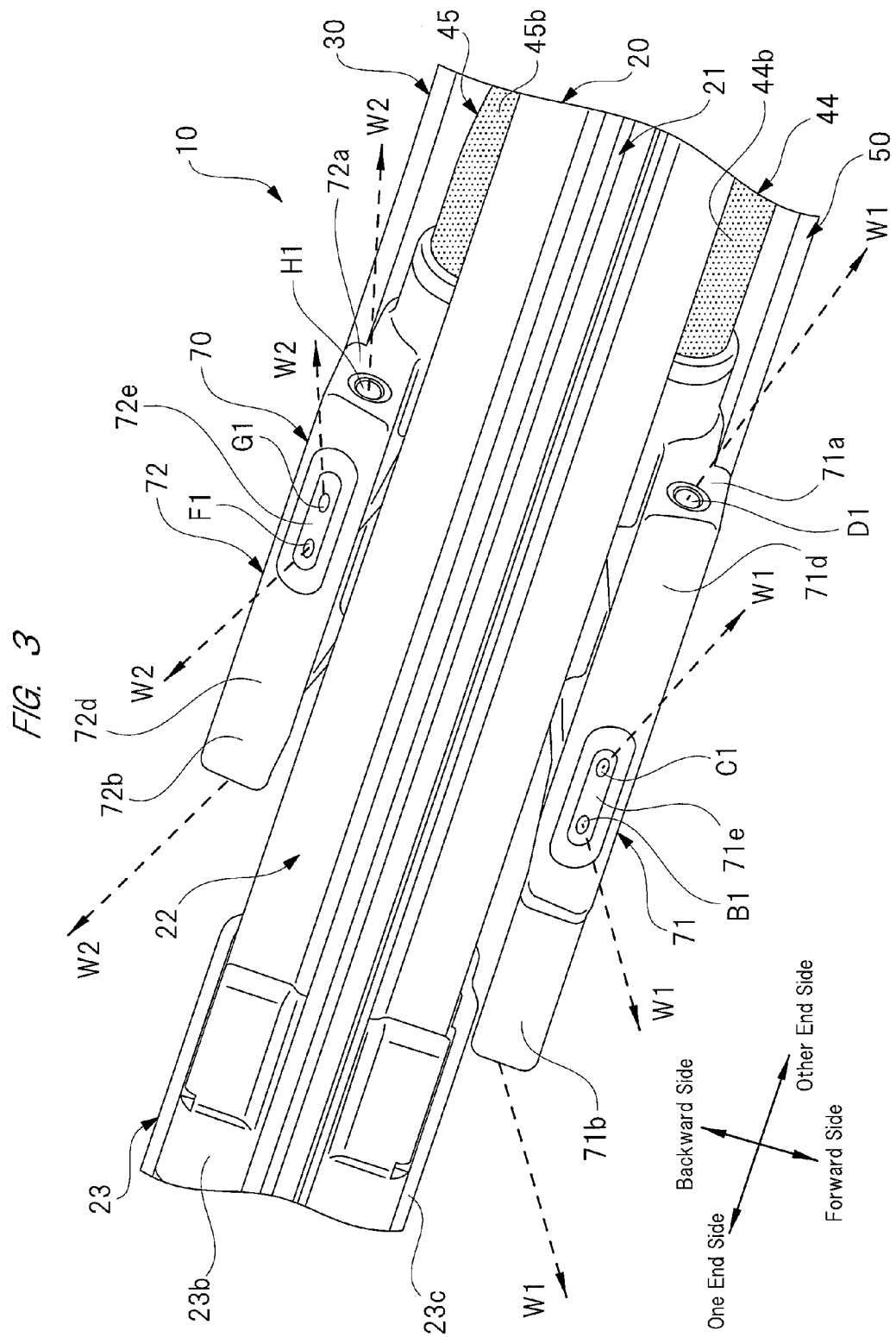
FIG. 3 is an enlarged perspective view of the surrounding part of the nozzle unit seen from its back side.
Figure 4:
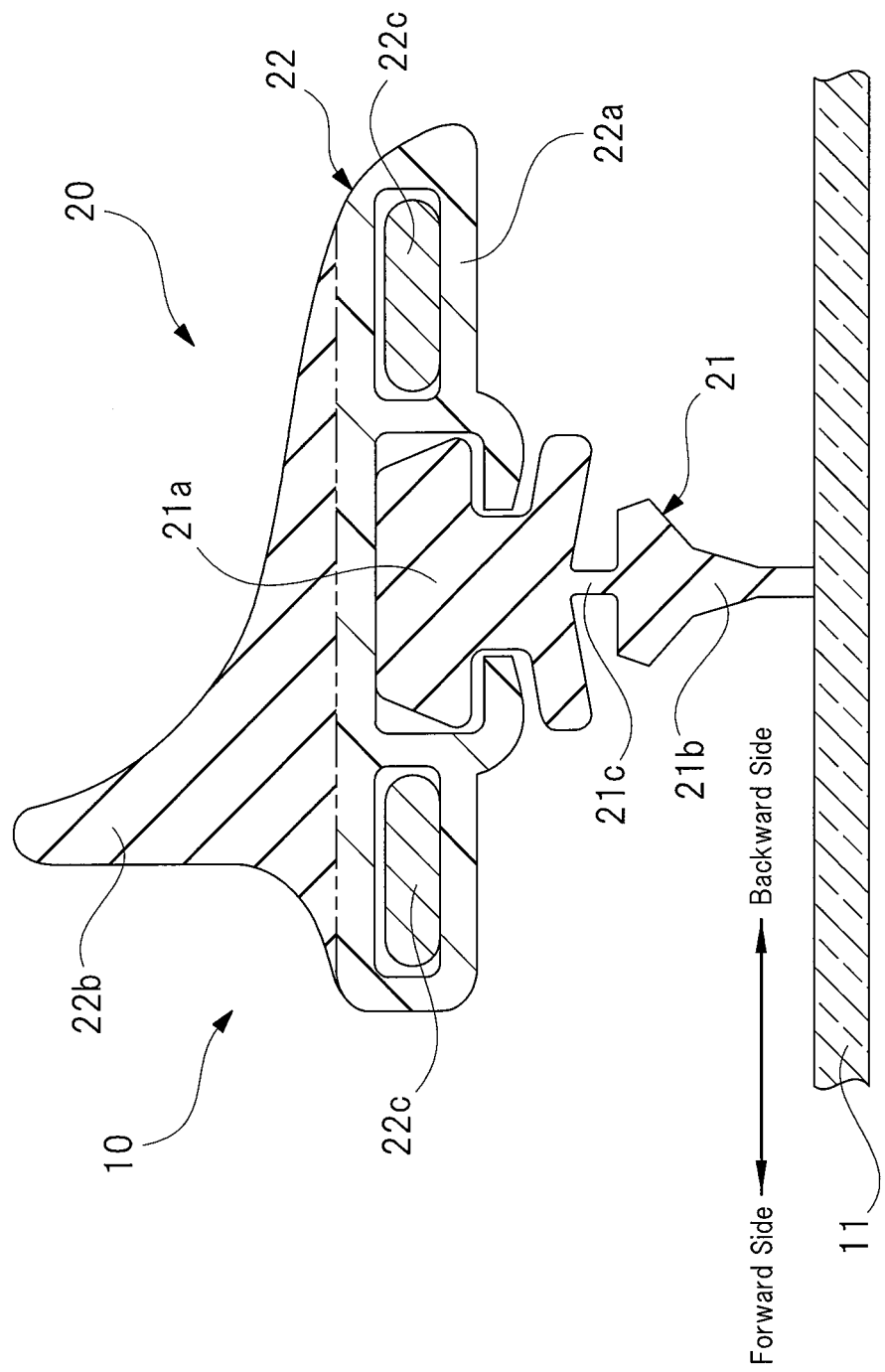
FIG. 4 is a sectional view taken along an A-A line of FIG. 1.
Figure 5:
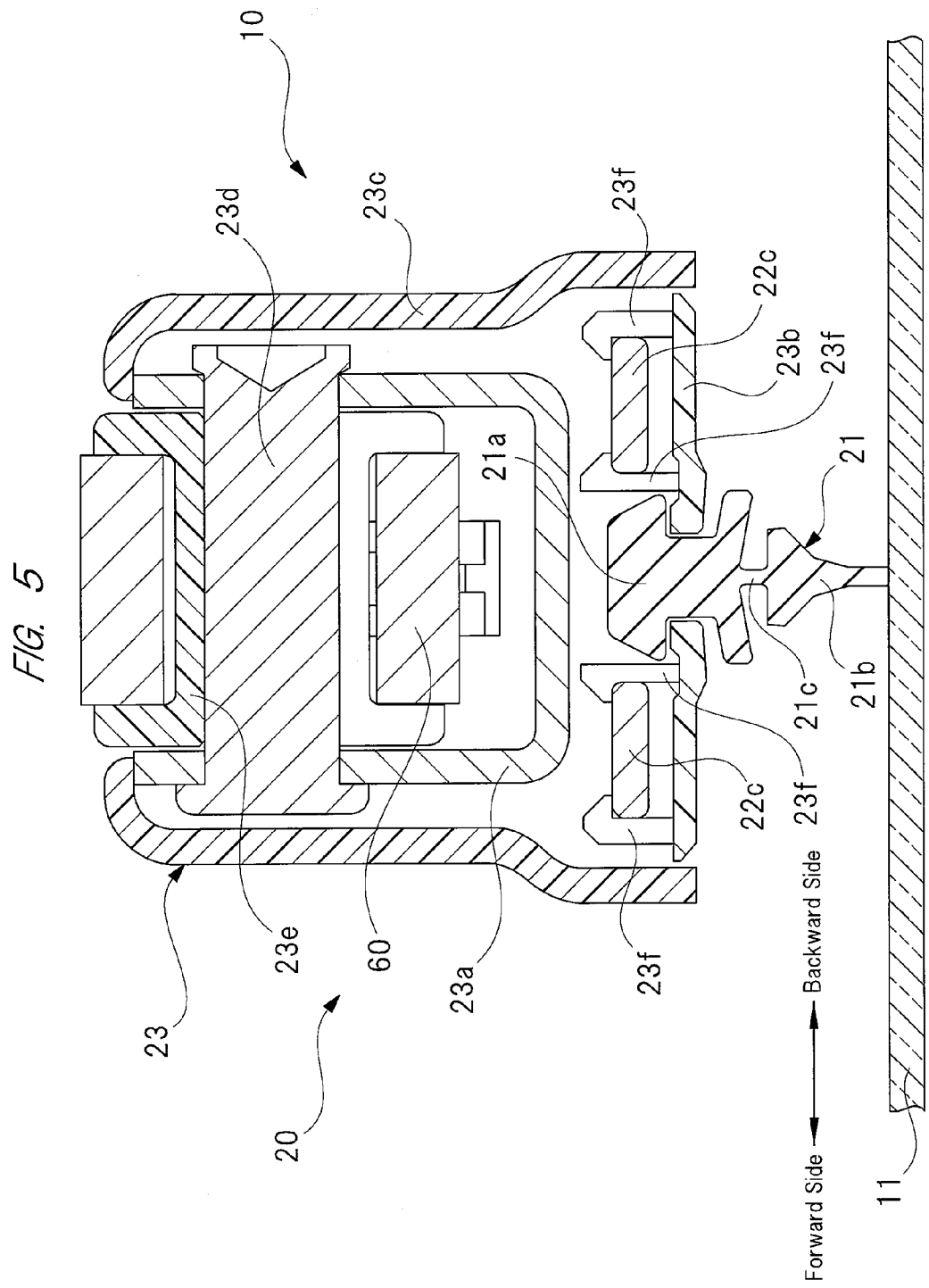
FIG. 5 is a sectional view taken along a B-B line of FIG. 2.
Figure 6:
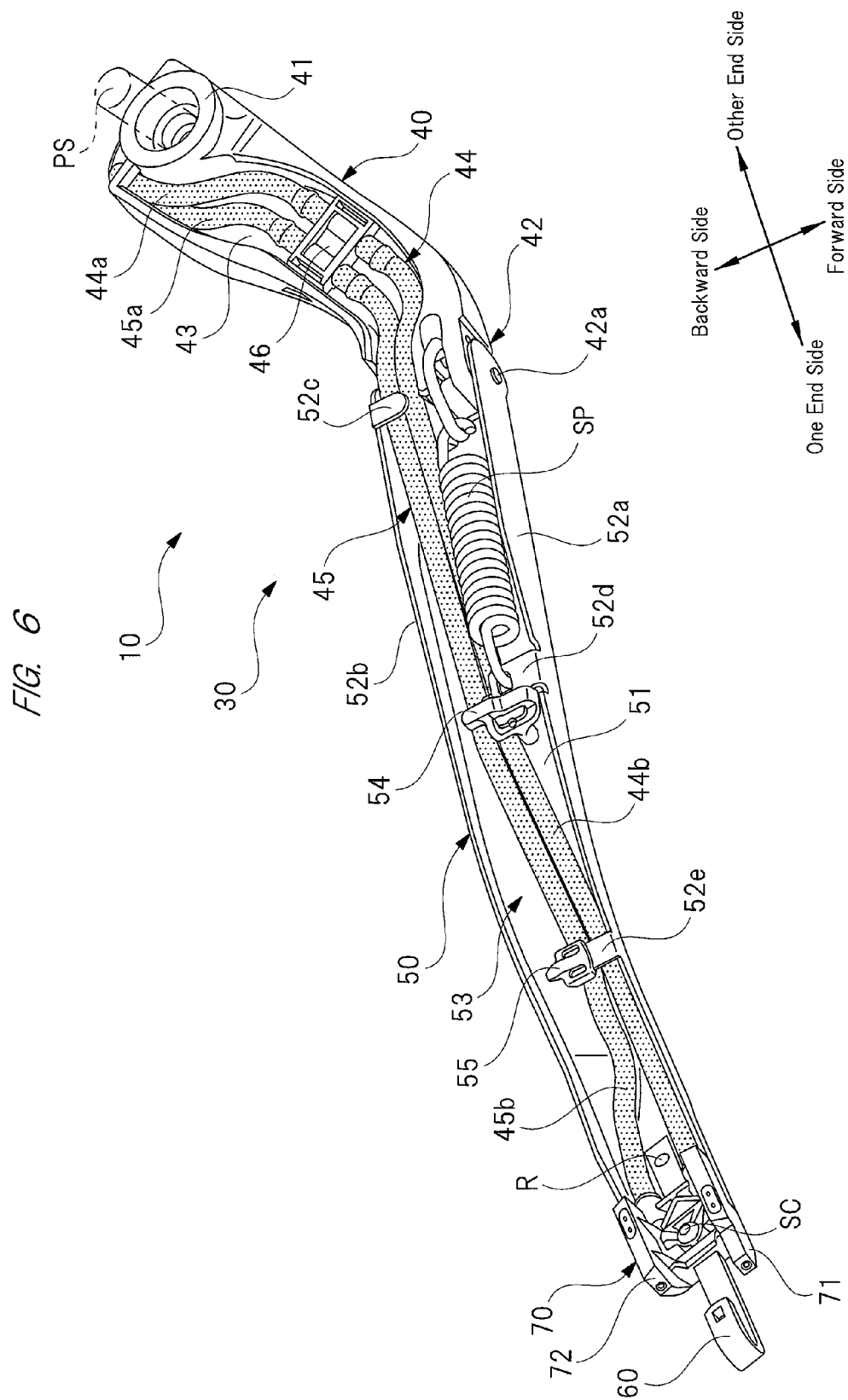
FIG. 6 is a perspective view of a wiper arm seen from its back side.
Figure 7:
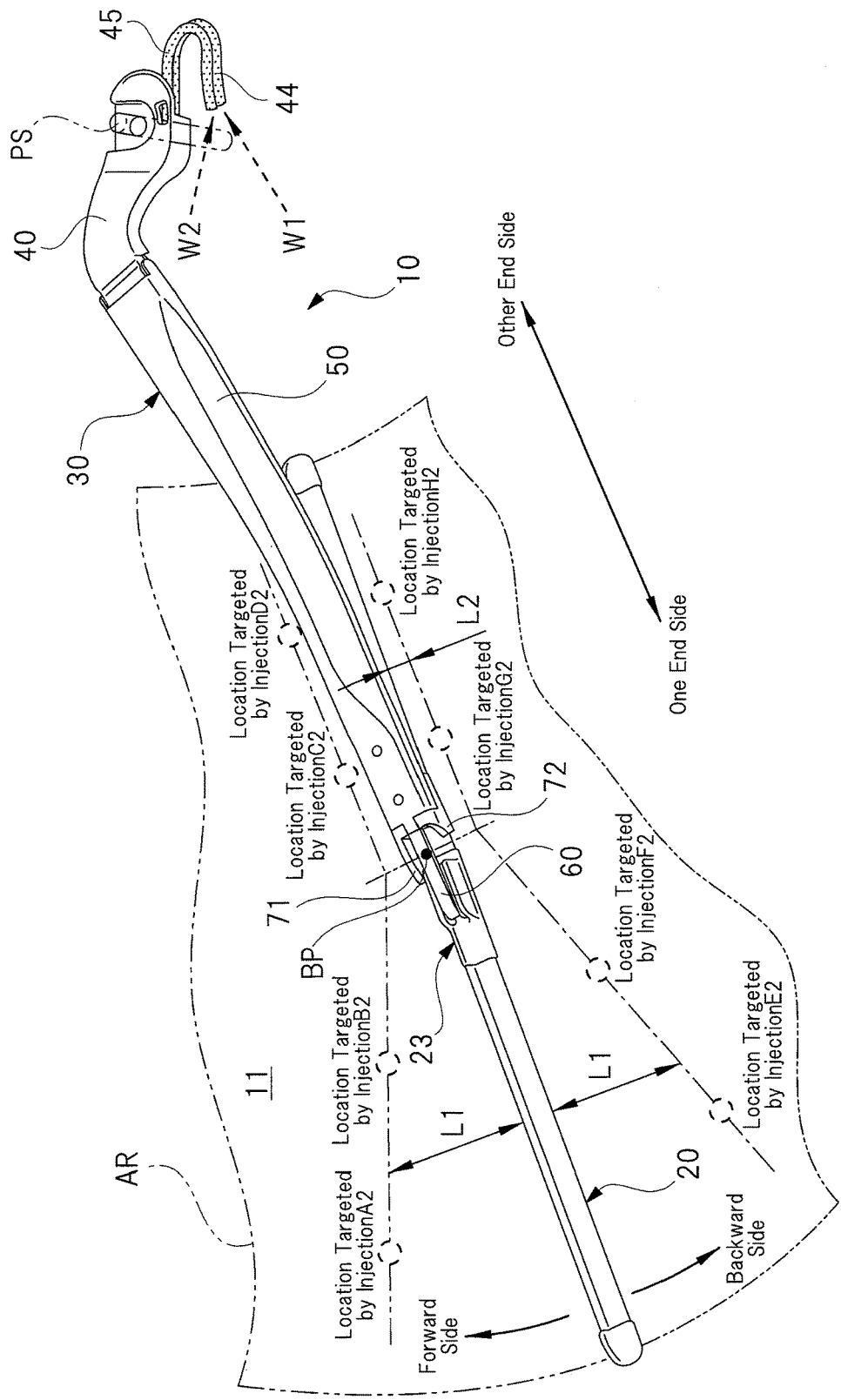
FIG. 7 is a perspective view explaining injection-target locations (injection points) for the wiper arm.
Figure 8:
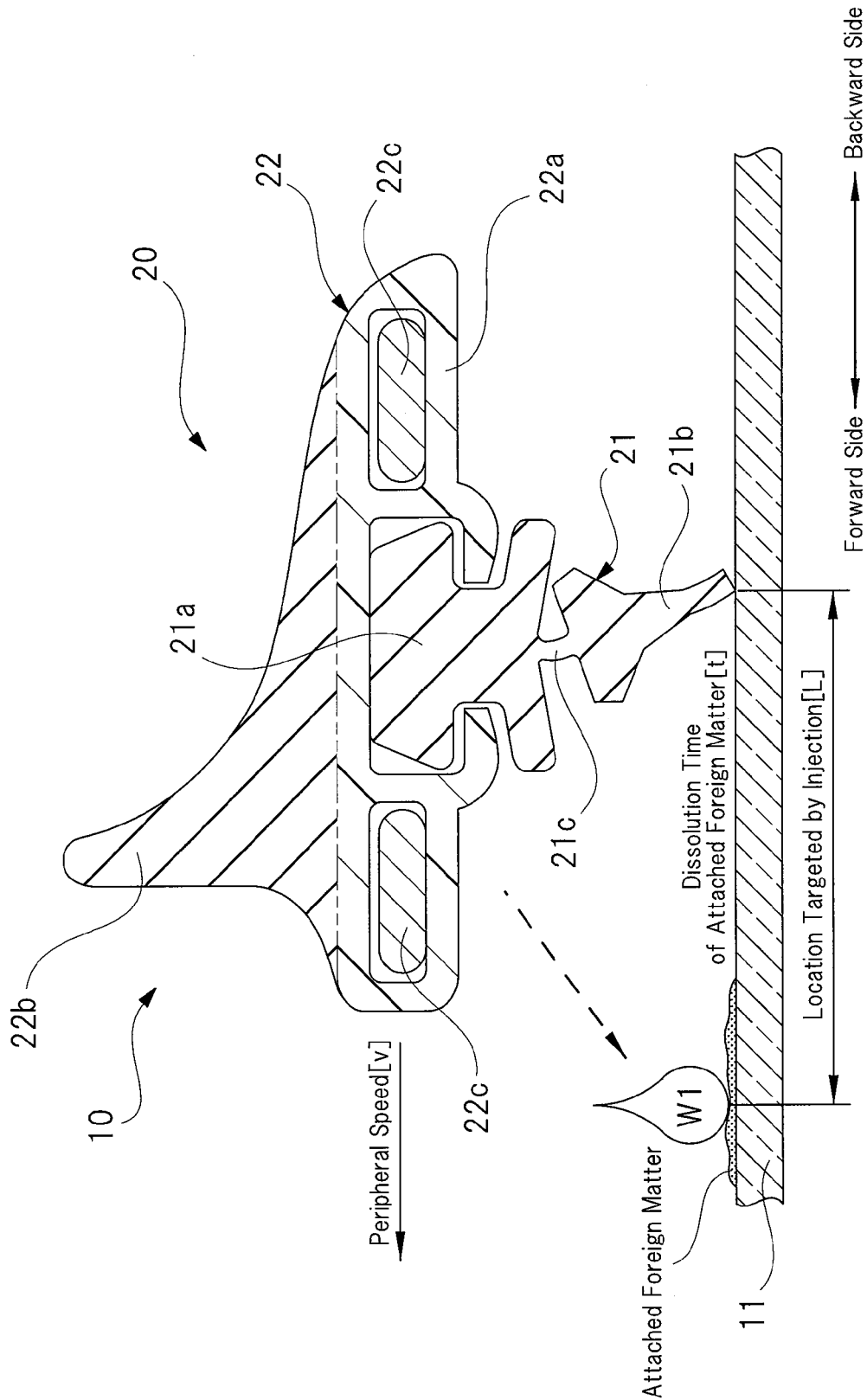
FIG. 8 is a diagrammatical view explaining a relation between the distance "L" between a wiper blade and an injection-target location, the circumferential speed "v" of the wiper blade, and a dissolving time "t" for attached foreign matters.

FIG. 1 is a perspective view of a wiper apparatus according to the present invention, FIG. 2 is an enlarged perspective view of the surrounding area of a nozzle unit seen from its front side, FIG. 3 is an enlarged perspective view of the surrounding area of the nozzle unit seen from its back side, FIG. 4 is a sectional view taken along an A-A line of FIG. 1, FIG. 5 is a sectional view taken along a B-B line of FIG. 2, FIG. 6 is a perspective view of a wiper arm seen from its back side, FIG. 7 is a perspective view explaining injection-target locations (injection points) for the wiper arm, and FIG. 8 is a diagrammatical view explaining a relation between the distance "L" between a wiper blade and an injection-target location, the circumferential speed "v" of the wiper blade, and a dissolving time "t" for attached foreign matter.

As shown in FIG. 1, a wiper apparatus 10 includes a wiper blade 20 and a wiper arm 30. The wiper blade 20 is fitted rotatably to one end of the wiper arm 30 and moves in slide contact with a windshield (a surface to be wiped) 11 disposed on the front side of a vehicle such as automotive vehicle. The other end of the wiper arm 30 is supported pivotally on a pivot shaft PS disposed on the front side of the vehicle. The pivot shaft PS thus serves as the center around which the wiper blade 20 is swung. By switching on a wiper switch (not shown) in the vehicle interior, the pivot shaft PS is pivotally moved by a wiper motor (not shown). As a result, the wiper apparatus 10 makes reciprocating wiping actions in forward-path direction and backward-path direction in a predetermined wiping area AR formed on the windshield 11, as indicated by arrows in FIG. 1.

As shown in FIGS. 1 to 5, the wiper blade 20 has a blade rubber 21 which is brought in contact with the windshield 11, a holder member 22 holding the blade rubber 21, and a connecting portion 23 provided to the middle part of the holder member 22 in its longitudinal direction. Both ends of the holder member 22 in its longitudinal direction are respectively fitted with a pair of end caps CP. The end caps CP prevent the blade rubber 21 from coming off from the holder member 22.

As shown in FIGS. 4 and 5, the blade rubber 21 has a body portion 21a held by the holder member 22, a lip portion 21b brought into contact with the windshield 11, and a neck portion 21c connecting the body portion 21a to the lip portion 21b. The blade rubber 21 is formed of elastic material such as rubber, and into an elongated shape by using extrusion molding, and its sectional shape is uniform across the entire part of the blade rubber 21 along its longitudinal direction.

In a moving direction of the blade rubber 21 (left-hand and right-hand directions in FIGS. 4 and 5), the neck portion 21c is smaller in thickness than each of the body portion 21a and the lip portion 21b. This allows the neck portion 21c to be elastically deformed easily. As a result, when the wiper blade 20 is moved in the forward and backward directions on the windshield 11, the lip portion 21b is allowed to be tilted, thereby permitting its front end to smoothly follow the body portion 21a in the moving direction of the wiper blade 20. Therefore, the wiper blade 20 can certainly wipe attached extraneous matter such as rainwater and dust (not shown) away from the windshield 11.

As shown in FIG. 4, the holder member 22 has a holder body 22a and a fin portion 22b. The holder body 22a and the fin portion 22b are different in material from each other, and formed into an integrated structure by a two-color molding method, and the holder member 22 are formed into an elongated shape as well as the blade rubber 21.

The holder body 22a is made of flexible resin material such as plastic which allows the holder body 22a to hold the body portion 21a of the blade rubber 21, and allows the holder body 22a to follow the curved surface of the windshield 11 (not shown). On the other hand, the fin portion 22b is made of elastic material such as rubber, and lower in hardness than the holder body 22a. In a moving vehicle, wind acting on the fin portion 22b creates a downward force acting on the wiper blade 20. This downward force keeps the blade rubber 21 capable of exerting high wiping capability.

In the holder body 22a, a pair of vertebras 22c is arranged at a predetermined interval. The vertebras 22c are each made of a steel plate having spring property and are set mirror symmetric such that one vertebra 22c on the forward-side and the other vertebra 22c on the backward-side sandwich the body portion 21a of the blade rubber 21. Each vertebra 22c in its natural state with no external force applied thereto is curved at a curvature that is larger than that of the windshield 11, causing the holder member 22 and blade rubber 21 to deform elastically in conformity to the curvature of the windshield 11. As a result, the entire part of the lip portion 21b in its longitudinal direction is stuck firmly to the windshield 11.

As shown in FIGS. 1 and 5, the connecting portion 23 is provided to the middle part of the holder member 22 in its longitudinal direction. The connecting portion 23 has a connecting body 23a, a base plate 23b, and a cover member 23c. The connecting body 23a is formed by press working a steel plate into a structure having a substantially U-shaped section, and is caulking-fixed to the vertebras 22c with fixing leg portions (not shown) integrally formed with the connecting body 23a.

A columnar pin 23d made of steel is caulking-fixed to the connecting body 23a. To this columnar pin 23d, a hook fixing member 23e made of resin material, such as plastic, is attached rotatably. To this hook fixing member 23e, an arm piece 60 fixed to one end of the wiper arm 30 (see FIG. 2) is connected through easy operation (with one touch). The columnar pin 23d and hook fixing member 23e make up the connecting portion 23.

The base plate 23b, which is made of resin material, such as plastic, and is formed into a tabular shape, is attached to the vertebras 22c with fixing leg portions 23f integrally formed with the base plate 23b. The connecting body 23a is located closer to the fin portion 22b (front side) of the holder member 22, while the base plate 23b is located closer to the holder body 22a (back side) of the holder member 22.

The cover member 23c is made of resin material such as plastic, formed substantially into a box shape, and attached to the exterior of the connecting body 23a with a plurality of engaging nails (not shown) formed integrally with the cover member 23c. The cover member 23c completely covers the side faces, etc., of the connecting body 23a, thereby gives the wiper blade 20 a better appearance.

As shown in FIGS. 1 and 6, the wiper arm 30 has an arm head 40, an arm shank 50, and the arm piece 60.

The arm head 40 is formed of aluminum by casting into a substantially J-shaped curved bar. On the base end of the arm head 40 (right-hand side of the arm head 40 in FIG. 6), a shaft fixing portion 41 is formed, and fitted on the pivot shaft PS. On the front end of the arm head 40 (left-hand side of the arm head 40 in FIG. 6), a shank fitting portion 42 is formed, and the other end of the arm shank 50 is rotatably fitted to the shank fitting portion 42.

As shown in FIG. 6, the shank fitting portion 42 is provided with a support pin 42a which rotatably supports the other end of the arm shank 50. The support pin 42a is made of a columnar piece of steel and extends in a direction intersecting with the direction of extension of the pivot shaft PS. This allows the arm shank 50 to be fitted rotatably without shakiness to the arm head 40 and to rock back easily.

The arm head 40 has a portion which is closer to the windshield 11 (this side in FIG. 6), and provided with a head-side pipeline housing section 43 opening toward the windshield 11. The head-side pipeline housing section 43 is formed in such a way as to cover the entire part of the arm head 40 in its longitudinal direction in conformity to the shape of the arm head 40. In other words, the section of the arm head 40 in its width direction is substantially U-shaped.

A forward-side washer tube (pipeline) 44 and a backward-side washer tube (pipeline) 45 are housed in the head-side pipeline housing section 43. To facilitate understanding of the arrangement of the washer tubes 44 and 45, they are hatched in FIG. 6.

As indicated by broken line arrows in FIG. 1, the washer tubes 44 and 45 are respectively supplied with a forward-side cleaning liquid W1 and a backward-side cleaning liquid W2, which are pumped out from a washer pump (not shown). The washer tubes 44 and 45 send the cleaning liquids W1 and W2 to a nozzle unit 70, which will be described later. As shown in FIG. 6, the forward-side washer tube 44 is composed of a vehicle-side tube 44a and a nozzle-side tube 44b, while the backward-side washer tube 45 is composed of a vehicle-side tube 45a and a nozzle-side tube 45b.

The vehicle-side tube 44a and the vehicle-side tube 45a are respectively connected to the nozzle-side tube 44b and the nozzle-side tube 45b through a joint member 46 fixed in the head-side pipeline housing section 43. This joint member 46 fixed in the head-side pipeline housing section 43 prevents the washer tubes 44 and 45 from loosening at the arm head 40. The washer tube 44 and the washer tube 45 are respectively divided into a set of the vehicle-side tube 44a and the nozzle-side tube 44b and a set of the vehicle-side tube 45a and the nozzle-side tube 45b through the joint member 46 serving as a partition. This allows the vehicle-side tubes 44a and 45a and the nozzle-side tubes 44b and 45b to be incorporated easily in the arm head 40 and the arm shank 50.

As shown in FIG. 6, respective parts of washer tubes 44 and 45 which are closer to the pivot shaft PS, the washer tubes 44 and 45 being housed in the head-side pipeline housing section 43, are put through a space avoiding the shaft fixing portion 41 and are collectively extended out of the arm head 40. Specifically, the parts of washer tubes 44 and 45 which are closer to the pivot shaft PS are lined up in the direction of extension of the pivot shaft PS (axial direction of the pivot shaft PS) and are lead out of the arm head 40.

This arrangement prevents the broadening of the surrounding part of the shaft fixing portion 41 at the arm head 40. When the arm head 40 is swung, each of the washer tubes 44 and 45 elastically deforms at the same radius of curvature along the periphery of the shaft fixing portion 41. This reduces a load applied to the pivot shaft PS (wiper motor) on the drive side.

In addition, respective parts of washer tubes 44 and 45 which are closer to the shank 50, the washer tubes 44 and 45 being housed in the head-side pipeline housing section 43, are lined up in the direction of extension of the support pin 42a (axial direction of the support pin 42a) and are lead out of the arm head 40.

In this arrangement, when the arm shank 50 is rocked back against the arm head 40, the washer tubes 44 and 45 are elastically deformed at the same radius of curvature, which applies substantially the same load to each of the washer tubes 44 and 45. This prevents such a problem that one of the washer tubes 44 and 45 deteriorates earlier than the other.

As shown in FIG. 6, the arm shank 50 is formed by press working a steel plate into a substantially straight long bar with a substantially U-shaped section. The other end of the arm shank 50 (right-hand end in FIG. 6) is fitted rotatably to the shank fitting portion 42 of the arm head 40, while one end (left-hand end in FIG. 6) of the arm shank 50 has the wiper blade 20 (see FIG. 1) fitted thereto via the arm piece 60. To the one end of the arm shank 50 in its longitudinal direction, that is, one end of the wiper arm 30, a nozzle unit 70 is attached, which jets the cleaning liquids W1 and W2 (see FIG. 3) toward the windshield 11.

The arm shank 50 has a bottom wall 51 and a pair of side walls 52a and 52b erected at right angles to the bottom wall 51. A space encircled with the bottom wall 51 and the pair of side walls 52a and 52b serves as a shank-side pipeline housing section 53. The shank-side pipeline housing section 53 houses the washer tubes 44 and 45, and extends to connect to the head-side pipeline housing section 43 formed in the arm head 40. In other words, the shank-side pipeline housing section 53 is formed along the longitudinal direction of the arm shank 50 and is opened toward the windshield 11.

Furthermore, a spring SP parallel to the washer tubes 44 and 45 is housed in the shank-side pipeline housing section 53. The spring SP generates an elastic force which presses the wiper blade 20 toward the windshield 11.

As shown in FIG. 6, on the other end of the arm shank 50 in its longitudinal direction, that is, the other end closer to the arm head 40, a projecting piece 52c is formed, which projects to overhang the opening of the arm shank 50. The projecting piece 52c is formed integrally with the side wall 52b of the arm shank 50 and holds the washer tubes 44 and 45. The projecting piece 52c thus prevents the washer tubes 44 and 45 from slipping off the shank-side pipeline housing section 53.

As shown in FIG. 6, on the approximate central part of the arm shank 50 in its longitudinal direction, a support piece 52d and a first tube holder 54 fitted to the support piece 52d are disposed. The support piece 52d projects to overhang the opening of the arm shank 50, and is formed integrally with the side wall 52a of the arm shank 50. The first tube holder 54, which is made of resin material, such as plastic, is formed into a predetermined shape, and is fitted to the support piece 52d as the washer tubes 44 and 45 are kept housed in the shank-side pipeline housing section 53. Specifically, the first tube holder 54 faces the support piece 52d, from the side closer to the one end of the arm shank 50 in its longitudinal direction (side closer to the nozzle unit 70) and is fitted to the support piece 52d.

The support piece 52d and first tube holder 54 hold the washer tubes 44 and 45 in a location avoiding the spring SP in the width direction of the arm shank 50. This keeps the washer tubes 44 and 45 away from the spring SP and prevents the washer tubes 44 and 45 from slipping off the arm shank 50.

As shown in FIG. 6, between the first tube holder 54 and the nozzle unit 70 along the longitudinal direction of the arm shank 50, a support piece 52e and a second tube holder 55 fitted to the support piece 52e are disposed. The support piece 52e projects to overhang the opening of the arm shank 50, and is formed integrally with the side wall 52a of the arm shank 50. The second tube holder 55, which is made of resin material, such as plastic, is formed substantially into a square, and is fitted to the support piece 52e as the washer tubes 44 and 45 are kept housed in the shank-side pipeline housing section 53. Specifically, the second tube holder 55 is fitted to the support piece 52e from the upper side of the opening of the arm shank 50 (this side in FIG. 6).

The washer tubes 44 and 45 are thus pressed by the second tube holder 55 and support piece 52e against the bottom wall 51 and are therefore prevented from slipping off the arm shank 50.

As shown in FIG. 6, the arm piece 60 fixed to the one end of the arm shank 50 in its longitudinal direction is formed by press working steel into a predetermined shape. The arm piece 60 has one end formed substantially into a "U" shape. The front end of the arm piece 60 is connected to the hook fixing member 23e (see FIG. 5) through easy operation (with one touch). The other end of the arm piece 60 is fixed to the interior of the one end part of the arm shank 50 with a pair of rivets "R" (see FIG. 2). In this manner, the arm shank 50 made of a steel plate and the arm piece 60 made of a steel are riveted together and are thus fixed firmly together without any shakiness.

To the arm piece 60, the nozzle unit 70 is fixed with a fixing screw SC (see FIG. 6), wherein the fixing screw SC is screwed from below in FIG. 2, that is, on the same side as the wiper blade 20, into a screw hole HL shown in FIG. 2. The arm piece 60 including this screw hole HL, and part of the nozzle unit 70 are covered with the arm shank 50. This structure puts the surrounding part of the nozzle unit 70 of the wiper apparatus 10 into a neat arrangement, thus gives the surrounding part a better appearance.

As shown in FIGS. 2 and 3, the nozzle unit 70 has nozzles which respectively jet cleaning liquids W1 and W2 in the wiping direction of the wiper blade 20. The nozzle unit 70 is formed of resin material such as plastic by injection molding, and the nozzle unit 70 has a U-shaped section in a direction (width direction) intersecting the longitudinal direction of the arm shank 50. In addition, the nozzle unit 70 has a forward-side block 71 and a backward-side block 72.

The forward-side block 71 is provided with a forward-side first wall portion 71a facing the arm head 40 (toward the right in FIGS. 2 and 3). The forward-side first wall portion 71a of the forward-side block 71 is connected to one end of the forward-side washer tube 44. The forward-side block 71 has a forward-side arm portion 71b integrally formed on the opposite side of the forward-side first wall portion 71a such that the forward-side arm portion 71b tapers gradually toward the connecting portion 23 (toward the left in FIGS. 2 and 3). The forward-side arm portion 71b is provided with a forward-side second wall portion 71c facing the connecting portion 23.

Furthermore, a forward-side counter surface 71d is formed between the forward-side first wall portion 71a and the forward-side second wall portion 71c of the forward-side block 71, and faces the windshield 11. The forward-side counter surface 71d has a portion which is closer to the forward-side second wall portion 71c, and a forward-side nozzle cap 71e is provided to this portion.

On the forward-side second wall portion 71c, a forward-side first injection nozzle A1 is provided, which jets the forward-side cleaning liquid W1. The jet direction of the forward-side first injection nozzle A1 is set opposite to the center of the swinging motion of the wiper blade 20 (set toward the connecting portion 23) and also opposite to the wiper blade 20. This means that the forward-side first injection nozzle A1 is not set in a direction of directly wetting the wiper blade 20 with the cleaning liquid. As a result, when the wiper blade 20 makes a wiping action along the forward path, the first injection nozzle A1 is able to wet an injection-target location A2 (see FIG. 7) on the windshield 11 on the front side, the injection-target location A2 being opposite to the center of the swinging motion of the wiper blade 20 and along the wiping direction of the wiper blade 20.

Here, a nozzle (commonly called "goggling nozzle") capable of varying the injection-target locations of the forward-side cleaning liquid W1 is adopted as the forward-side first injection nozzle A1. Specifically, the injection-target location of the forward-side first injection nozzle A1 can be adjusted by putting a needle, etc., in the nozzle A1 and rotate it. This allows the injection-target location of the forward-side first injection nozzle A1 to be optimized according to the length of the wiper blade 20 attached to the wiper arm 30, which length varies depending on the specifications of the wiper blade 20.

The forward-side nozzle cap 71e is provided with a forward-side second injection nozzle B1 and a forward-side third injection nozzle C1 each of which jets the forward-side cleaning liquid W1. Each of the forward-side second injection nozzle B1 and forward-side third injection nozzle C1 is provided as a nozzle with the fixed injection-target location of the forward-side cleaning liquid W1. The forward-side second injection nozzle B1 faces the connecting portion 23, while the forward-side third injection nozzle C1 faces the arm head 40. The forward-side cleaning liquid W1 jetted from the forward-side second injection nozzle B1 and forward-side third injection nozzle C1 wets an injection-target location B2 and an injection-target location C2 (see FIG. 7), which are near the central part of the blade rubber 21 in its longitudinal direction and are on the forward-side. Similar to the forward-side first injection nozzle A1, each of the forward-side second injection nozzle B1 and forward-side third injection nozzle C1 is not set in a direction of directly wetting the wiper blade 20.

Here, among the injection-target locations A2, B2, and C2, the injection-target location A2 is the most distant from the center of the swinging motion of the wiper blade 20 in the direction of moving opposite to the center of the swinging motion and is the most distant from the wiper blade 20 in its wiping direction. In contrast, the injection-target location C2 is the closest to the center of the swinging motion of the wiper blade 20 in the direction of approaching the center of the swinging motion and is the closet to the wiper blade 20 in its wiping direction. As shown in FIG. 7, the injection-target location B2 is in the middle between the injection-target location A2 and the injection-target location C2.

As shown in FIG. 3, the forward-side first wall portion 71a is provided with a forward-side fourth injection nozzle D1 which jets the forward-side cleaning liquid W1. The jet direction of the forward-side fourth injection nozzle D1 is set toward the center of the swinging motion of the wiper blade 20 (toward the arm head 40) and is set opposite to the wiper blade 20. This means that the forward-side fourth injection nozzle D1 is not set in a direction of directly wetting the wiper blade 20 with the cleaning liquid. As a result, when the wiper blade 20 makes a wiping action along the forward path, the fourth injection nozzle D1 is able to wet an injection-target location D2 (see FIG. 7) on the windshield 11 on the front side, the injection-target location D2 being closer to the center of the swinging motion of the wiper blade 20 and along the wiping direction of the wiper blade 20.

Here, similar to the case of the forward-side first injection nozzle A1, a goggling nozzle capable of varying the injection-target locations of the forward-side cleaning liquid W1 is adopted as the forward-side fourth injection nozzle D1. This allows the injection-target location of the forward-side fourth injection nozzle D1 to be optimized according to the specifications of the wiper blade 20. The injection-target location D2 is closer to the center of the swinging motion of the wiper blade 20 than the injection-target location C2. The injection-target location D2 and injection-target location C2 are each separated from the wiper blade 20 in its wiping direction, by the same distance.

In this manner, the forward-side block 71 is provided with a total of four injection nozzles A1 to D1, each of which jets the forward-side cleaning liquid W1 in the forward-side wiping direction of the wiper blade 20. In addition, the injection-target locations of the forward-side cleaning liquid W1 to be jetted from the injection nozzles A1 to D1 are determined such that the injection-target locations in an area opposite to an area closer to the center of the swinging motion of the wiper blade 20 are more distant from the wiper blade 20 in its wiping direction than the injection-target locations in the area closer to the center of the swinging motion of the wiper blade 20, as show in FIG. 7.

More specifically, when a location at which the nozzle unit 70 is disposed is determined to be a base point BP relative to the wiper blade 20, the injection-target locations B2 and A2 are gradually distanced from the wiper blade 20 in its wiping direction as it goes from the base point BP toward the area opposite to the area closer to the center of the swinging motion of the wiper blade 20. In other words, in the area opposite to the area closer to the center of the swinging motion of the wiper blade 20 with respect to the base point BP, a distance L1 between the wiper blade 20 and the injection-target location is set such that the distance L1 gradually increases as it goes in the direction opposite to the center of the swinging motion. In the area closer to the center of the swinging motion of the wiper blade 20 with respect to the base point BP, on the other hand, the distances between the injection-target locations C2 and D2 and the wiper blade 20 are determined to be a constant distance L2.

The backward-side block 72 is provided with a backward-side first wall portion 72a facing the arm head 40. The backward-side first wall portion 72a of the backward-side block 72 is connected to one end of the backward-side washer tube 45. The backward-side block 72 also has a backward-side arm portion 72b formed integrally on the opposite side of the backward-side first wall portion 72a such that the backward-side arm portion 72b tapers gradually toward the connecting portion 23. The backward-side arm portion 72b is provided with a backward-side second wall portion 72c facing the connecting portion 23.

Furthermore, between the backward-side first wall portion 72a and the backward-side second wall portion 72c of the backward-side block 72, a backward-side counter surface 72d is formed, and counter to the windshield 11. On the part of backward-side counter surface 72d which is closer to the backward-side second wall portion 72a, a backward-side nozzle cap 72e is formed.

On the backward-side second wall portion 72c, a backward-side first injection nozzle E1 is formed, which jets the backward-side cleaning liquid W2. The jet direction of the backward-side first injection nozzle E1 is set opposite to the center of the swinging motion of the wiper blade 20 (set toward the connecting portion 23) and also opposite to the wiper blade 20. This means that the backward-side first injection nozzle E1 is not set in a direction of directly wetting the wiper blade 20 with the cleaning liquid. As a result, when the wiper blade 20 makes a wiping action along the backward path, the first injection nozzle E1 is able to wet an injection-target location E2 (see FIG. 7) on the windshield 11 on the front side, the injection-target location E2 being opposite to the center of the swinging motion of the wiper blade 20 and along the wiping direction of the wiper blade 20.

Here, a goggling nozzle capable of varying the injection-target locations of the backward-side cleaning liquid W2 is adopted as the backward-side first injection nozzle E1. Specifically, the injection-target location of the backward-side first injection nozzle E1 can be adjusted by putting a needle, etc., in the nozzle E1 and rotate it. This allows the injection-target location of the forward-side first injection nozzle E1 to be optimized according to the length of the wiper blade 20 attached to the wiper arm 30, which length varies depending on the specifications of the wiper blade 20.

The backward-side nozzle cap 72e is provided with a backward-side second injection nozzle F1 and a backward-side third injection nozzle G1 each of which jets the backward-side cleaning liquid W2. Each of the backward-side second injection nozzle F1 and backward-side third injection nozzle G1 is provided as a nozzle with the fixed injection-target location of the backward-side cleaning liquid W2. The backward-side second injection nozzle F1 faces the connecting portion 23, while the backward-side third injection nozzle G1 faces the arm head 40. The backward-side cleaning liquid W2 jetted from the backward-side second injection nozzle F1 and backward-side third injection nozzle G1 wets an injection-target location F2 and an injection-target location G2 (see FIG. 7), which are near the central part of the blade rubber 21 in its longitudinal direction and are on the backward-side. Similar to the backward-side first injection nozzle E1, each of the backward-side second injection nozzle F1 and backward-side third injection nozzle G1 is not set in a direction of directly wetting the wiper blade 20.

Here, among the injection-target locations E2, F2, and G2, the injection-target location E2 is the most distant from the center of the swinging motion of the wiper blade 20 in the direction of moving opposite to the center of the swinging motion and is the most distant from the wiper blade 20 in its wiping direction. In contrast, the injection-target location G2 is the closest to the center of the swinging motion of the wiper blade 20 in the direction of approaching the center of the swinging motion and is the closet to the wiper blade 20 in its wiping direction. As shown in FIG. 7, the injection-target location F2 is in the middle between the injection-target location E2 and the injection-target location G2.

As shown in FIG. 3, the backward-side first wall portion 72a is provided with a backward-side fourth injection nozzle H1 which jets the backward-side cleaning liquid W2. The jet direction of the backward-side fourth injection nozzle H1 is set toward the center of the swinging motion of the wiper blade 20 (toward the arm head 40) and is set opposite to the wiper blade 20. This means that the backward-side fourth injection nozzle H1 is not set in a direction of directly wetting the wiper blade 20 with the cleaning liquid. As a result, when the wiper blade 20 makes a wiping action along the backward path, the fourth injection nozzle H1 is able to wet an injection-target location H2 (see FIG. 7) on the windshield 11 on the front side, the injection-target location H2 being closer to the center of the swinging motion of the wiper blade 20 and along the wiping direction of the wiper blade 20.

Here, similar to the case of the backward-side first injection nozzle E1, a goggling nozzle capable of varying the injection-target locations of the backward-side cleaning liquid W2 is adopted as the backward-side fourth injection nozzle H1. This allows the injection-target locations of the backward-side fourth injection nozzle H1 to be optimized according to the specifications of the wiper blade 20. The injection-target location H2 is closer to the center of the swinging motion of the wiper blade 20 than the injection-target location G2. The injection-target location H2 and injection-target location G2 are each separated from the wiper blade 20 in its wiping direction, by the same distance.

In this manner, the backward-side block 72 is provided with four injection nozzles E1 to H1 each of which jets the backward-side cleaning liquid W2 in the backward-side wiping direction of the wiper blade 20. The injection-target locations of the backward-side cleaning liquid W2 jetted from the injection nozzles E1 to H1 are determined such that the injection-target locations in the area opposite to the area closer to the center of the swinging motion of the wiper blade 20 are more distant from the wiper blade 20 in its wiping direction than the injection-target locations in the area closer to the center of the swinging motion of the wiper blade 20, as show in FIG. 7.

More specifically, when the location at which the nozzle unit 70 is disposed is determined to be the base point BP relative to the wiper blade 20, the injection-target locations F2 and E2 are gradually distanced from the wiper blade 20 in its wiping direction as it goes from the base point BP toward the area opposite to the area closer to the center of the swinging motion of the wiper blade 20. In other words, in the area opposite to the area closer to the center of the swinging motion of the wiper blade 20 with respect to the base point BP, the distance L1 between the wiper blade 20 and the injection-target location is set such that the distance L1 gradually increases as it goes in the direction opposite to the center of the swinging motion. In the area closer to the center of the swinging motion of the wiper blade 20 with respect to the base point BP, on the other hand, the distances between the injection-target locations G2 and H2 and the wiper blade 20 are determined to be the constant distance L2.

Here, in the wiper apparatus 10 of this embodiment, as shown in FIG. 7, from among the distance L2 between the wiper blade 20 and each of the injection-target locations C2, D2, G2, and H2, the closest target location to the wiper blade 20 in its wiping direction is set on the basis of the following conditions.

When the injection-target locations of the cleaning liquids W1 and W2 are close to the wiper blade 20 (blade rubber 21), the jetted cleaning liquids W1 and W2 hardly block the driver's field of view, but immediately wiped out after being jetted out. The cleaning liquids W1 and W2 thus fail to dissolve dust, etc., attached on the windshield 11, leaving some of the dust, etc., not wiped out (drop in wiping performance).

On the other hand, when the injection-target locations of the cleaning liquids W1 and W2 are determined to be distant from the wiper blade 20 (blade rubber 21), the jetted cleaning liquids W1 and W2 certainly dissolve dust, etc., attached on the windshield 11, allowing the wiper blade 20 to wipe dust, etc., completely away from the windshield 11, but, unfortunately, blocks the driver's field of view (blockage of the field of view).

As shown in FIG. 8 (which depicts only the forward-side), when the circumferential speed of the blade rubber 21 is denoted as [v], a dissolving time for attached extraneous matter is denoted as [t], and the distance from the blade rubber 21 to each of the injection-target locations of the cleaning liquids W1 and W2, i.e., jet distance, is denoted as [L], the jet distance [L] is determined to be the distance satisfying an equation: [L=V×t]. This allows balanced achievement of an improvement in the extraneous matter wiping performance and prevention of blockage of the field of view, which are advantages cancelling each other in a trade-off relation. According to this embodiment, the jet distance [L] is determined to be about 15 mm.

Here, the circumferential speed [v] of the blade rubber 21 represents a moving speed of the center of the swinging motion (inner circumference side) of the blade rubber 21 in its longitudinal direction with a commonly used wiper switch being set to [Low] to run the wiper blade. With this circumferential speed, the blockage of the field of view is prevented and attached extraneous matter is wiped out completely in an area covered by the center of the swinging motion of the blade rubber 21 in its longitudinal direction, which area is in front of the driver, etc.

On the other hand, in an area covered by the opposite side (outer circumference side), where the field of view is blocked to relatively less extent, to the center of the swinging motion of the blade rubber 21 in its longitudinal direction, the injection-target locations of the cleaning liquids W1 and W2 are determined to be the injection-target locations B2, A2, F2, and E2, which are more distant from the blade rubber 21 than the injection-target locations C2, D2, G2, and H2. This arrangement is made to ensure the sufficient dissolving time [t] for the extraneous matter attached on the windshield 11, based on the fact that in this area covered by the outer circumference side of the blade rubber 21, the field of view is blocked to relatively less extent and the circumferential speed of the blade rubber 21 is higher.

Each flow of the forward-side cleaning liquid W1 and the backward-side cleaning liquid W2 will then be described with reference to the drawings.

By switching on a washer switch (not shown), the washer pump (not shown) is driven, thereby supplying the cleaning liquids W1 and W2 to the forward-side washer tube 44 and the backward-side washer tube 45 as indicated by broken line arrows in FIG. 1. The cleaning liquids W1 and W2 then flow into the forward-side block 71 and the backward-side block 72, respectively, as shown in FIG. 3. Consequently, as indicated by broken line arrows in FIG. 3, the cleaning liquid W1 is jetted from the forward-side injection nozzles A1 to D1 and the cleaning liquid W2 is jetted from the backward-side injection nozzles E1 to H1.

Here, in response to switching of the moving direction of the blade rubber 21, the direction of drive of the washer pump is switched. More specifically, when the wiper blade 20 makes a wiping action toward the forward-side, the forward-side cleaning liquid W1 is supplied only to the forward-side block 71. When the wiper blade 20 makes a wiping action toward the backward-side, the backward-side cleaning liquid W2 is supplied only to the backward-side block 72. As a result, the cleaning liquids W1 and W2 are jetted out by turns in the forward-side wiping direction and backward-side wiping direction of the wiper blade 20, respectively.

As described above in detail, according to the wiper apparatus 10 of this embodiment, the jet directions of the cleaning liquids W1 and W2 jetted from the four forward-side injection nozzles A1 to D1 and four backward-side injection nozzles E1 to H1, respectively, are set opposite to the wiper blade 20. The injection-target locations of the cleaning liquids W1 and W2 are determined such that the injection-target locations in the area opposite to the area closer to the center of the swinging motion of the wiper blade 20 are more distant from the wiper blade 20 in its wiping direction than the injection locations in the area closer to the center of the swinging motion of the wiper blade 20. In the area closer to the center of the swinging motion of the wiper blade 20, therefore, the blockage of the field of view is prevented. In the area opposite to the area closer to the center of the swinging motion of the wiper blade 20, on the other hand, dust, etc., is wetted sufficiently to improve the wiping performance.

According to the wiper apparatus 10 of this embodiment, when the location at which the nozzle unit 70 is disposed is determined to be the base point BP relative to the wiper blade 20, and the injection-target locations B2, A2, F2, and E2 are gradually distanced from the wiper blade 20 in its wiping direction as it goes from the base point BP toward the area opposite to the area closer to the center of the swinging motion of the wiper blade 20. When the location at which the nozzle unit 70 is disposed is determined to be the base point BP relative to the wiper blade 20, the distance from the wiper blade 20 to each of the injection-target locations C2, D2, G2, and H2 is determined to be the constant distance L2 in an area which is closer to the center of the swinging motion of the wiper blade 20 with respect to the base point BP. This further prevents the blockage of the field of view and improves the wiping performance.

According to the wiper apparatus 10 of this embodiment, the shortest distance "L" selected from among distances between the wiper blade and injection-target locations satisfies the equation shown below. This allows the injection-target locations to be determined as a dissolving time for extraneous matter attached on the windshield 11 is taken into consideration, thus ensuring the sufficient wiping performance.

$$L = v \times t \qquad \text{eq.}$$

where "L" denotes the jet distance, "v" denotes the circumferential speed of the wiper blade, and "t" denotes the dissolving time for attached foreign matter.

Second Embodiment

A second embodiment of the present invention will then be described in detail with reference to the drawings. Components the same in function as components described in the first embodiment will be denoted by the identical reference numerals and omitted in further description.

Figure 9:
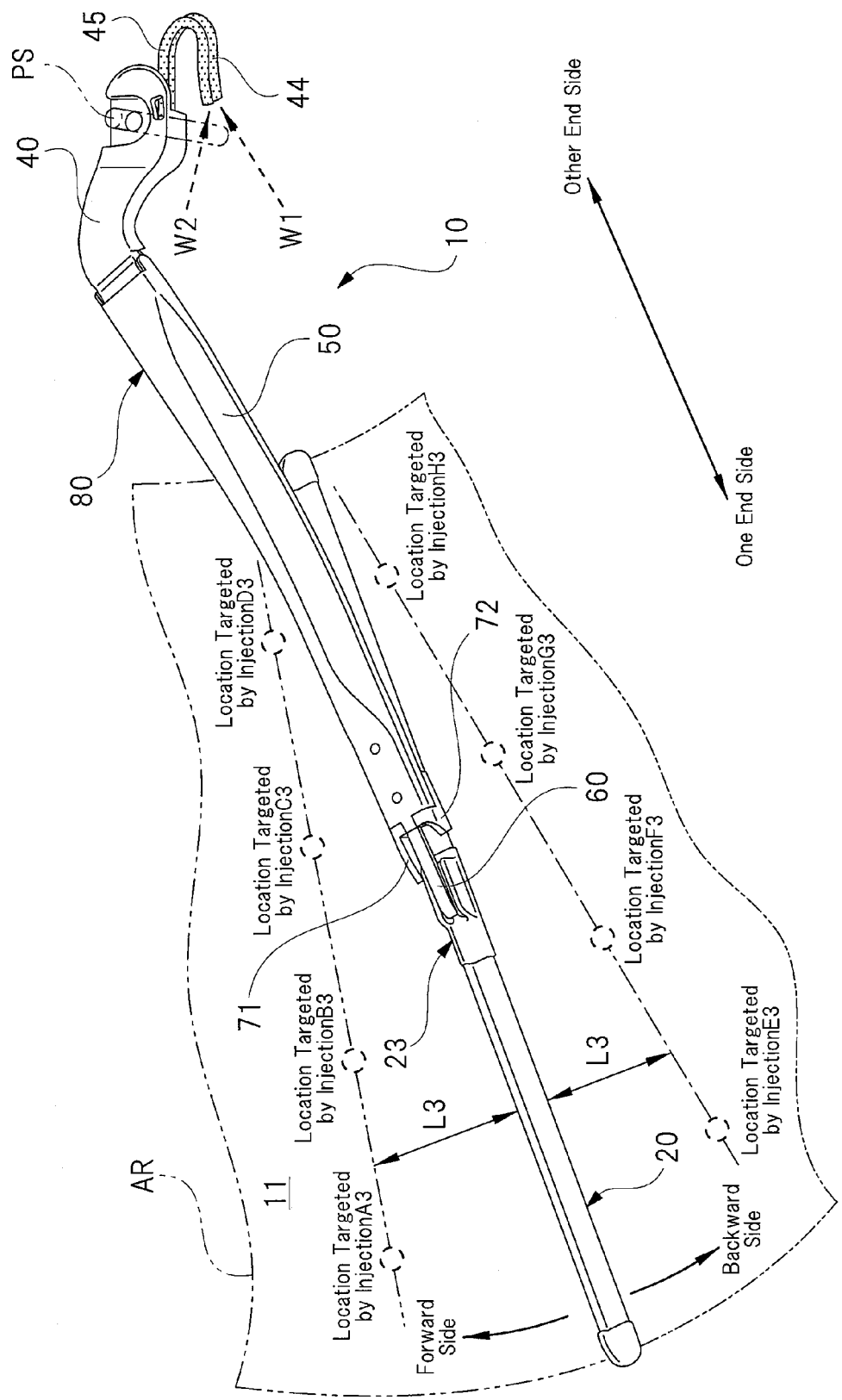
FIG. 9 is a perspective view explaining injection-target locations (injection points) for a wiper arm in a second embodiment.

FIG. 9 is a perspective view explaining the injection-target locations (injection points) of a wiper arm in the second embodiment.

As shown in FIG. 9, a wiper arm 80 of the second embodiment is different from the wiper arm 30 of the first embodiment (see FIG. 7) in the injection-target locations of the cleaning liquids W1 and W2 jetted from the forward-side injection nozzles A1 to D1 and the backward-side injection nozzles E1 to H1. Specifically, as shown in FIG. 9, injection-target locations D3, C3, B3, and A3 and injection-target locations H3, G3, F3, and E3 are gradually distanced from the wiper blade 20 in its wiping direction as it goes from the area closer to the center of the swinging motion (inner circumference side) in the longitudinal direction of the wiper blade 20 to the area opposite to that area (outer circumference side). In other words, the distance L3 between the wiper blade 20 and the injection-target location is gradually increased as it goes from the area closer to the center of the swinging motion (inner circumference side) in the longitudinal direction of the wiper blade 20 to the area opposite to that area (outer circumference side).

The wiper apparatus 10 according to the second embodiment configured in the above manner offers the same effects as those of the wiper apparatus 10 according to the first embodiment.

The present invention is not limited to the above embodiments and may obviously be modified into various forms of applications on the condition that the modification does not deviate from the substance of the invention. In the above embodiments described as examples, the nozzle unit 70 has four forward-side injection nozzles and four backward-side injection nozzles. The injection nozzle is, however, not limited to this arrangement. The nozzle unit 70 may have at least two forward-side injection nozzles as well as two backward-side injection nozzles, or may have forward-side injection nozzles and backward-side injection nozzles different in number from each other.

The present invention is applied to the wiper apparatus 10 which wipes the windshield 11 disposed on the front side of the vehicle as described in the above embodiments. In addition, the present invention may be applied to a wiper apparatus which wipes a rear window disposed on the rear side of the vehicle. The present invention may be applied to not only a wiper apparatus to be incorporated in a vehicle such as automotive vehicle, but also a wiper apparatus to be incorporated in railroad vehicle, airplane, ship, etc.

In the foregoing, the invention made by the inventors of the present invention has been concretely described based on the embodiments. However, it is needless to say that the present invention is not limited to the foregoing embodiments and various modifications and alterations can be made within the scope of the present invention.

What is claimed is:

1. A wiper apparatus, comprising:
a wiper blade which wipes a windshield;

a wiper arm having two ends, the wiper blade and a nozzle unit being attached to one end of the wiper arm, and the other end of the wiper arm being supported and pivotally moved with respect to a pivot shaft; and nozzles provided to the nozzle unit and adapted to jet cleaning liquid in a wiping direction of the wiper blade, wherein the cleaning liquid is jetted from the nozzles in a direction opposite to the wiper blade, and toward respective injection-target locations, a distance between the wiper blade and each of injection-target locations on the opposite side from the center of the swinging motion of the wiper blade in the wiping direction of the wiper blade is larger than a distance between the wiper blade and each of injection-target locations on the same side as the center of the swinging motion of the wiper blade in the wiping direction of the wiper blade, wherein the shortest distance "L" selected among distances between the wiper blade and the injection-target locations satisfies the following equation, $$L = v \times t$$

wherein "L" denotes a jet distance, "v" denotes a circumferential speed of the wiper blade, and "t" denotes a dissolving time for attached foreign matters.

2. The wiper apparatus according to claim 1, wherein
a location at which the nozzle unit is disposed is defined as a base point relative to the wiper blade,
injection-target locations, which are in an area farther from the center of the swinging motion of the wiper blade than the base point, are gradually distanced from the wiper blade in the wiping direction with an increasing distance from the base point.

3. The wiper apparatus according to claim 1, wherein
a location at which the nozzle unit is disposed is defined as a base point relative to the wiper blade,
the distances from the wiper blade to respective injection-target locations, which are in an area closer to the center of the swinging motion of the wiper blade than the base point, are the same as each other.

* * * * *